(12) United States Patent
Cheng et al.

(10) Patent No.: US 7,774,159 B2
(45) Date of Patent: Aug. 10, 2010

(54) 3D MULTI-DEGREE OF FREEDOM DETECTING DEVICE AND METHOD FOR USING THE SAME

(75) Inventors: Chia-Chu Cheng, Yonghe (TW);
Jau-Yu Chen, Taipei (TW);
Chih-Cheng Kuan, Taipei (TW)

(73) Assignee: Lite-On Semiconductor Corp., Taipei Hsien (TW)

( * ) Notice: Subject to any disclaimer, the term of this patent is extended or adjusted under 35 U.S.C. 154(b) by 22 days.

(21) Appl. No.: 12/131,272

(22) Filed: Jun. 2, 2008

(65) Prior Publication Data
US 2009/0119061 A1 May 7, 2009

(30) Foreign Application Priority Data
Nov. 7, 2007 (TW) .............................. 96141995 A

(51) Int. Cl.
*G01C 9/00* (2006.01)
*G01C 21/02* (2006.01)
*G06K 9/00* (2006.01)

(52) U.S. Cl. .................... 702/152; 250/206.2; 382/154

(58) Field of Classification Search ................ 702/152, 702/127, 150–151, 153–155, 158, 172, 189, 702/57, 60, 69, 72–73, 75–76, 79, 81, 84, 702/182–183; 250/200, 206.02, 491.1, 492.1, 250/493.1, 494.1, 552, 553, 559.01, 559.03, 250/559.05, 559.07, 559.08, 559.15, 559.19, 250/559.29, 559.37, 559.38, 580; 356/138, 356/140, 141.1, 141.2, 141.3, 141.5, 147, 356/614, 622, 625; 382/106, 154; 348/135, 348/162; 359/515, 527; 73/1.79, 1.81
See application file for complete search history.

(56) References Cited

OTHER PUBLICATIONS

Chen et al., An Optoelectronic Measurement System for Measuring 6-Degree-of-Freedom Motion Error of Rotary Parts, Oct. 19, 2007, Optics Express, vol. 15, No. 22, pp. 14601-14617.*

* cited by examiner

*Primary Examiner*—Michael P Nghiem
*Assistant Examiner*—Toan M Le
(74) *Attorney, Agent, or Firm*—Rabin & Berdo, P.C.

(57) ABSTRACT

A 3D multi-degree of freedom detecting device includes a first electromagnetic radiation source, a second electromagnetic radiation source, a first sensing module, and at least one second sensing module. The first electromagnetic radiation source is used to generate first electromagnetic radiations, and the first electromagnetic radiation source is a point source. The second electromagnetic radiation source is used to generate second electromagnetic radiations, and the second electromagnetic radiation source is a point source. The first sensing module has a plurality of first sensing elements for receiving different radiation energies generated by the first electromagnetic radiations and the second electromagnetic radiations from different spatial angles. The at least one second sensing module has a plurality of second sensing elements for receiving different radiation energies generated by the first electromagnetic radiations and the second electromagnetic radiations from different spatial angles.

16 Claims, 17 Drawing Sheets

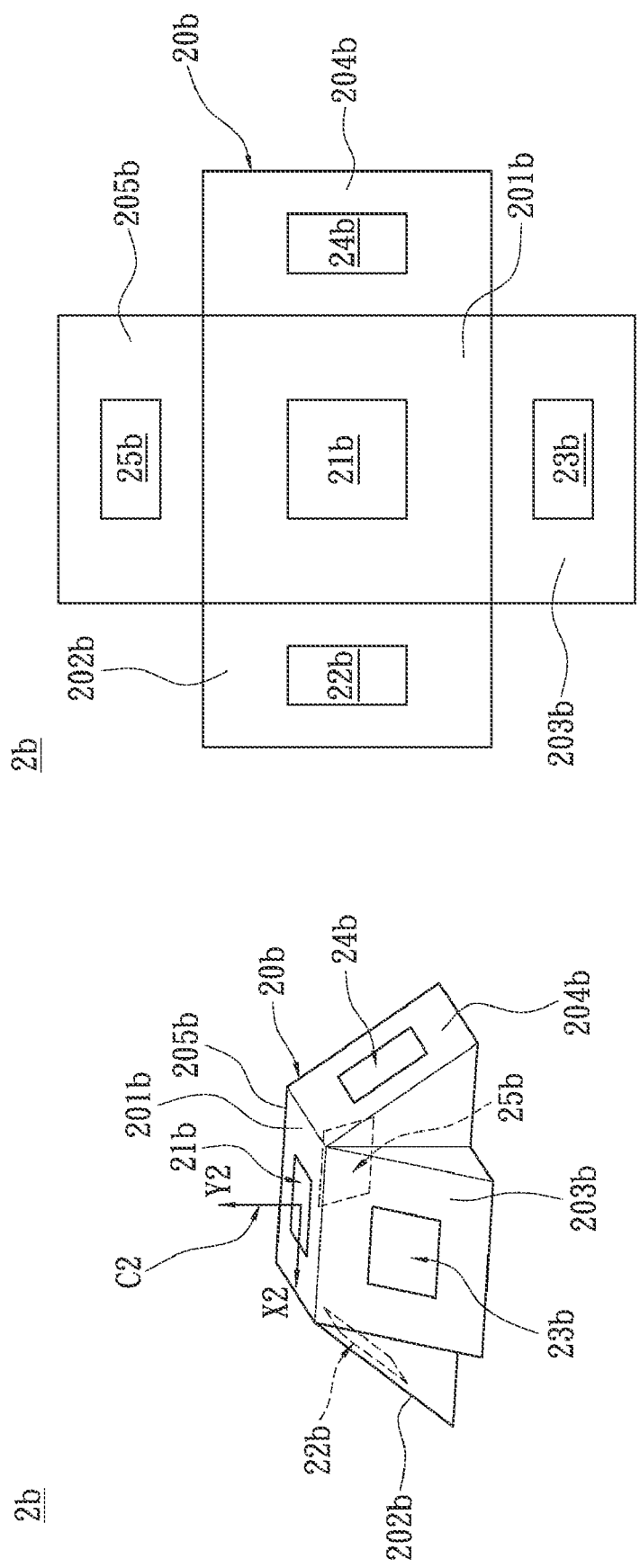

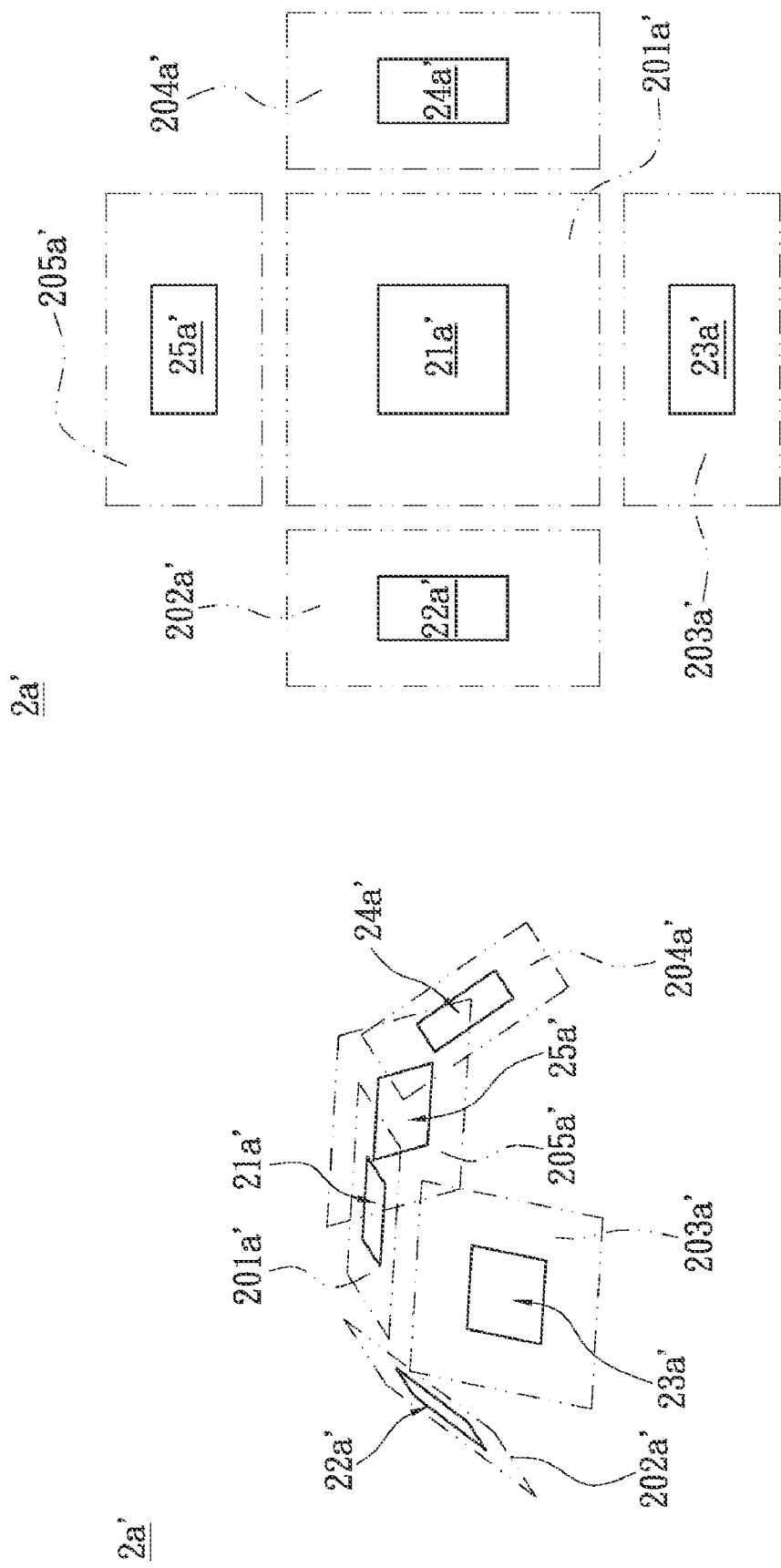

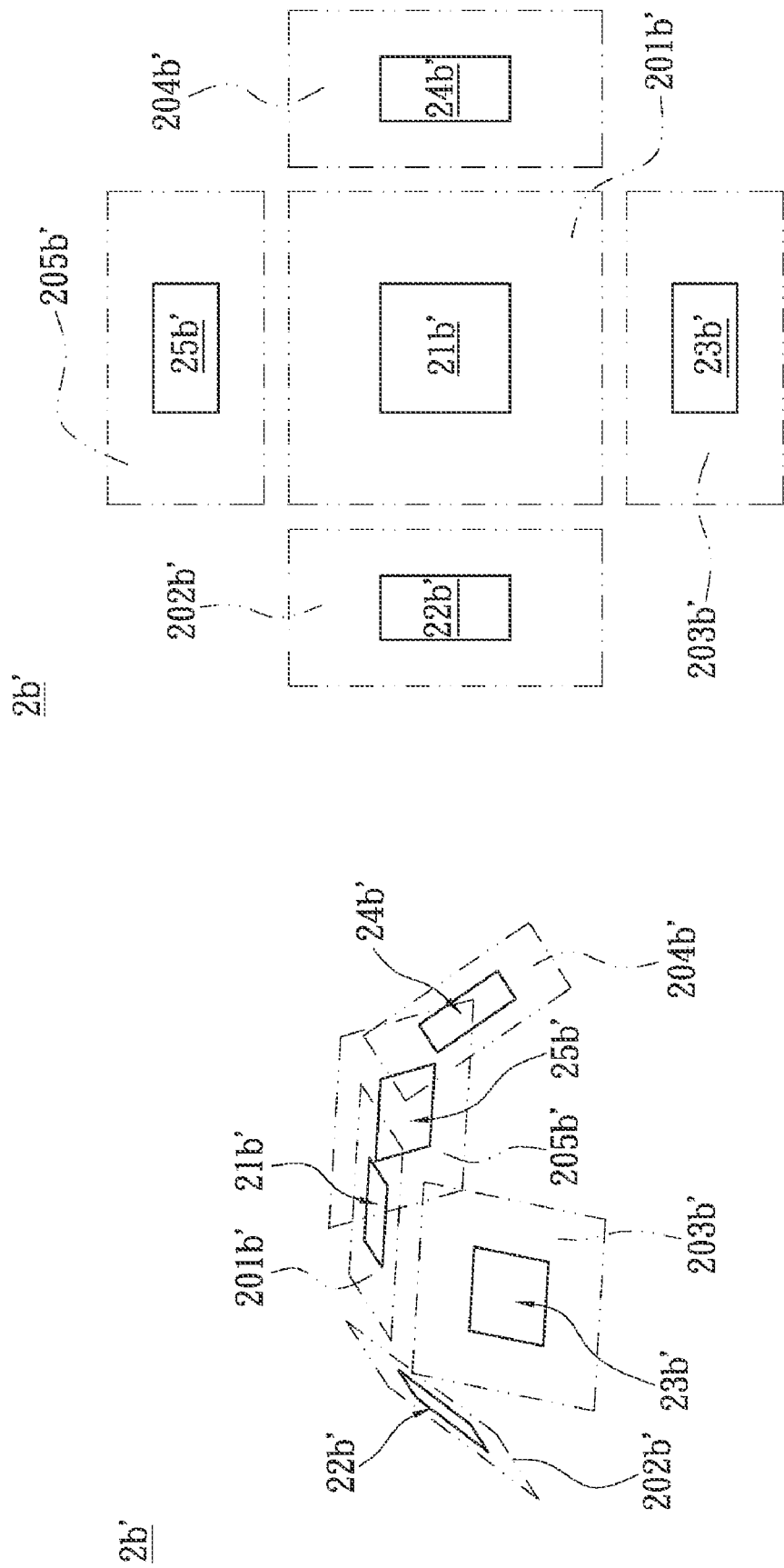

Providing a first electromagnetic radiation source for generating first electromagnetic radiations, a second electromagnetic radiation source for generating second electromagnetic radiations, a first sensing module having a first base and a plurality of first sensing elements, and a second sensing module having a second base and a plurality of second sensing elements, the first electromagnetic radiations having first modulation signals, the second electromagnetic radiations having second modulation signals, the first base having a plurality of surfaces on different planes, the first sensing elements being disposed on the surfaces of the first base, the second base having a plurality of surfaces on different planes, and the second sensing elements being disposed on the surfaces of the second base —S100

↓ —S1

Using the first sensing elements for receiving different radiation energies generated by the first electromagnetic radiations and the second electromagnetic radiations from different spatial angles, the normal vector of the first sensing element of the first sensing module being parallel to a reference axis of a spatial coordinate, and the normal vectors of the other first sensing elements of the first sensing module each are relative to the reference axis in order to generate corresponding included angles —S102

↓

Selecting the radiation energies that are generated by the first and the second electromagnetic radiations and are received by one part of the first sensing elements and are higher than the radiation energies received by the other first sensing elements —S106

↓ —S110

The value of two first spatial direction angles of the first electromagnetic radiation source and the second electromagnetic radiation source relative to the first sensing module is figured out according to the matrix operation of the radiation energies received by the one part of the first sensing elements and the two first projection transformation matrixes built by the first sensing module relative to the first electromagnetic radiation source and the second electromagnetic radiation source

↓

Figuring out two first spatial distances respectively from the first electromagnetic radiation source and the second electromagnetic radiation source to the first sensing module —S114

```
┌─────────────────────────────────────────────────┐
│  Providing a first electromagnetic radiation source for
│    generating first electromagnetic radiations, a second
│   electromagnetic radiation source for generating second
│ electromagnetic radiations, a third electromagnetic radiation
│    source for generating third electromagnetic radiations, a
│    first sensing module having a plurality of first sensing
│   elements, and a second sensing module having a plurality of
│ second sensing elements, the first electromagnetic radiations
│  having first modulation signals, the second electromagnetic
│   radiations having second modulation signals, and the third
│   electromagnetic radiations having second modulation signals
└─────────────────────────────────────────────────┘
                          │
                          ▼                              S200
┌─────────────────────────────────────────────────┐
│   Using the first sensing elements and the second sensing
│    elements respectively receive different radiation energies
│       from different spatial direction angles generated by the
│            first electromagnetic radiations from the first
│     electromagnetic radiation source, the second electromagnetic
│     radiations from the second electromagnetic radiations source
│         and the third electromagnetic radiations from the third
│   electromagnetic radiation source, from different spatial angles
└─────────────────────────────────────────────────┘
                                                       S202
         ┌────────────────────┴────────────────────┐
         ▼                                         ▼
┌──────────────────────────┐          ┌──────────────────────────┐
│ Obtaining the values of three │      │ Obtaining the values of three │
│ first spatial direction angles│      │ second spatial direction angles│
│  of the first, the second and │      │  of the first, the second and │
│    the third electromagnetic  │      │    the third electromagnetic  │
│  radiation sources relative to│      │  radiation sources relative to│
│    the first sensing module   │      │   the second sensing module   │
│    according to the magnitude │      │    according to the magnitude │
│  relationship of the radiation│      │  relationship of the radiation│
│    energies of the first, the │      │    energies of the first, the │
│       second and the third    │      │       second and the third    │
│     electromagnetic radiation │      │     electromagnetic radiation │
│      sources received by the  │      │      sources received by the  │
│         first sensing module  │      │         second sensing module │
└──────────────────────────┘          └──────────────────────────┘
         │                                         │
         └──────────────────┐  ┌──────────────────┘
   S204                     ▼  ▼                    S206
                          ┌─────┐
                          │ S1  │
                          └─────┘

| Obtaining a first spatial coordinate position of the first electromagnetic radiation source relative to the first sensing module and the second sensing module according to the matrix operation of a first spatial distance and a second spatial distance from the first electromagnetic radiation source to the first sensing module and the second sensing module and the first spatial direction angle and the second spatial direction of the first electromagnetic radiation source relative to the first sensing module and the second sensing module | S208 |
|---|---|

↓

| Obtaining a second spatial coordinate position of the second electromagnetic radiation source relative to the first sensing module and the second sensing module according to the matrix operation of a first spatial distance and a second spatial distance from the second electromagnetic radiation source to the first sensing module and the second sensing module and the first spatial direction angle and the second spatial direction of the second electromagnetic radiation source relative to the first sensing module and the second sensing module | S210 |
|---|---|

↓

| Obtaining a third spatial coordinate position of the third electromagnetic radiation source relative to the first sensing module and the second sensing module according to the matrix operation of a first spatial distance and a second spatial distance from the third electromagnetic radiation source to the first sensing module and the second sensing module and the first spatial direction angle and the second spatial direction of the third electromagnetic radiation source relative to the first sensing module and the second sensing module | S212 |
|---|---|

↓

| Generating three linear vectors in space and a plane built by the three linear vectors by three lines extended from the first spatial coordinate position to the second spatial coordinate position, from the second spatial coordinate position to the third spatial coordinate position, and from the third spatial coordinate position to the first spatial coordinate position, and obtaining rotation information of the plane in space according to the vector variation of any one linear vector in space and the normal vector variation of the plane | S214 |
|---|---|

FIG. 7-2

3D MULTI-DEGREE OF FREEDOM DETECTING DEVICE AND METHOD FOR USING THE SAME

BACKGROUND OF THE INVENTION

1. Field of the Invention

The present invention relates to a direction detecting device and a method for using the same, and particularly relates to a 3D multi-degree of freedom detecting device and a method for using the same.

2. Description of the Related Art

FIG. 1 shows a perspective, schematic view of a 3D multi-degree of freedom detecting device of the prior art. The 3D multi-degree of freedom detecting device of the prior art uses a digital camera D to capture the image information of an object H directly, and then the image information is calculated by an image processing software in order to obtain the position of the object H in space.

However, in the prior art it is inconvenient for user to obtain the position of the object H in space by using both the digital camera D and the image processing software.

SUMMARY OF THE INVENTION

One particular aspect of the present invention is to provide a 3D multi-degree of freedom detecting device and a method for using the same. The present invention is used to detect two degrees of rotational freedom and three degrees of linear freedom of the 3D multi-degree of freedom detecting device in space by matching at least two electromagnetic radiation sources for generating electromagnetic radiations and at least two sensing modules having a plurality of sensing elements. In addition, the present invention is used to detect three degrees of rotational freedom and three degrees of linear freedom of the 3D multi-degree of freedom detecting device in space by matching at least three electromagnetic radiation sources for generating electromagnetic radiations and at least two sensing modules having a plurality of sensing elements.

In order to achieve the above-mentioned aspects, the present invention provides a 3D multi-degree of freedom detecting device, including: a first electromagnetic radiation source, a second electromagnetic radiation source, a first sensing module, and at least one second sensing module.

The first electromagnetic radiation source is used to generate first electromagnetic radiations, and the first electromagnetic radiation source is a point source. The second electromagnetic radiation source is used to generate second electromagnetic radiations, and the second electromagnetic radiation source is a point source. The first sensing module has a plurality of first sensing elements for receiving different radiation energies generated by the first electromagnetic radiations and the second electromagnetic radiations from different spatial angles. The at least one second sensing module has a plurality of second sensing elements for receiving different radiation energies generated by the first electromagnetic radiations and the second electromagnetic radiations from different spatial angles.

The first sensing elements and the second sensing elements respectively receive different radiation energies from different spatial direction angles generated by the first electromagnetic radiation source relative to the first sensing elements and the second sensing elements, so that the values of a first spatial direction angle and a second spatial direction angle of the first electromagnetic radiation source respectively relative to the first sensing module and the second sensing module are obtained according to the magnitude relationship of the radiation energies received by the first sensing module and the second sensing module. A first spatial coordinate position of the first electromagnetic radiation source relative to the first sensing module and the second sensing module is obtained according to the matrix operation of a first spatial distance, a second spatial distance, and the first spatial direction angle and the second spatial direction angle of the first electromagnetic radiation source respectively relative to the first sensing module and the second sensing module. The first spatial distance and the second spatial distance are respectively from the first electromagnetic radiation source to the first sensing module and the second sensing module.

The first sensing elements and the second sensing elements respectively receive different radiation energies from different spatial direction angles generated by the second electromagnetic radiation source relative to the first sensing elements and the second sensing elements, so that the values of a first spatial direction angle and a second spatial direction angle of the second electromagnetic radiation source respectively relative to the first sensing module and the second sensing module are obtained according to the magnitude relationship of the radiation energies received by the first sensing module and the second sensing module. A second spatial coordinate position of the second electromagnetic radiation source relative to the first sensing module and the second sensing module is obtained according to the matrix operation of a first spatial distance, a second spatial distance, and the first spatial direction angle and the second spatial direction angle of the second electromagnetic radiation source respectively relative to the first sensing module and the second sensing module. The first spatial distance and the second spatial distance are respectively from the second electromagnetic radiation source to the first sensing module and the second sensing module.

Therefore, a line extended from the first spatial coordinate position to the second spatial coordinate position generate a linear vector in space, and rotation information of the linear vector in space is obtained according to the vector variation of the linear vector in space.

In order to achieve the above-mentioned aspects, the present invention provides a method for using a 3D multi-degree of freedom detecting device, including:

(a) providing an first electromagnetic radiation source for generating first electromagnetic radiations, an second electromagnetic radiation source for generating second electromagnetic radiations, a first sensing module having a plurality of first sensing elements, and at least one second sensing module having a plurality of second sensing elements, wherein the first and the second electromagnetic radiation sources are point sources;

(b) using the first sensing elements and the second sensing elements for receiving different radiation energies generated by the first electromagnetic radiations from the first electromagnetic radiation source and the second electromagnetic radiations from the second electromagnetic radiation source from different spatial angles;

(c) obtaining the values of two first spatial direction angles of the first electromagnetic radiation source respectively relative to the first sensing module and the second sensing module according to the magnitude relationship of the radiation energies received by the first sensing module and the second sensing module;

(d) obtaining the values of two second spatial direction angles of the second electromagnetic radiation source respectively relative to the first sensing module and the second sensing module according to the magnitude relationship of the radiation energies received by the first sensing module and the second sensing module;

(e) obtaining a first spatial coordinate position of the first electromagnetic radiation source relative to the first sensing module and the second sensing module according to the matrix operation of a first spatial distance, a second spatial distance, and the first spatial direction angle and the second spatial direction of the first electromagnetic radiation source relative to the first sensing module and the second sensing module; the first spatial distance and the second spatial distance respectively from the first electromagnetic radiation source to the first sensing module and the second sensing module;

(f) obtaining a second spatial coordinate position of the second electromagnetic radiation source relative to the first sensing module and the second sensing module according to the matrix operation of a first spatial distance, a second spatial distance, and the first spatial direction angle and the second spatial direction of the second electromagnetic radiation source relative to the first sensing module and the second sensing module; the first spatial distance and the second spatial distance respectively from the second electromagnetic radiation source to the first sensing module and the second sensing module; and (g) generating a linear vector in space by a line extended from the first spatial coordinate position to the second spatial coordinate position, and obtaining rotation information of the linear vector in space according to the vector variation of the linear vector in space.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which:

FIG. 2C is a perspective, schematic view of a second sensing module of the first embodiment of the present invention;

FIG. 2D is a top, schematic view of a second sensing module of the first embodiment of the present invention;

FIG. 5A is a perspective, schematic view of a first sensing module of the fourth embodiment of the present invention;

FIG. 5B is a top, schematic view of a first sensing module of the fourth embodiment of the present invention;

FIG. 5C is a perspective, schematic view of a second sensing module of the fourth embodiment of the present invention;

FIG. 5D is a top, schematic view of a second sensing module of the fourth embodiment of the present invention;

FIGS. 6-1, 6-2 and 6-3 are a flow chart of a method for using a 3D multi-degree of freedom detecting device according to the first embodiment of the present invention;

FIGS. 7-1 and 7-2 are a flow chart of a method for using a 3D multi-degree of freedom detecting device according to the second embodiment of the present invention.

DETAILED DESCRIPTION OF THE PREFERRED EMBODIMENTS

Referring to FIGS. 2A to 2E, the first embodiment provides a 3D multi-degree of freedom detecting device that includes a first electromagnetic radiation source 1, a second electromagnetic radiation source 1', a first sensing module 2a and a second sensing module 2b (It means two or more than two sensing modules can be applied to the present invention).

The first electromagnetic radiation source 1 is used to generate first electromagnetic radiations (10a, 10b) having first modulation signals. The second electromagnetic radiation source 1' is used to generate second electromagnetic radiations (10a', 10b') having second modulation signals. The first and the second electromagnetic radiation source 1, 1' can emit visible light or invisible light; alternatively, the first and the second electromagnetic radiation source 1, 1' can be point source. The first and the second modulation signals can be amplitude modulation, frequency modulation or phase modulation. The wavelength of the first and the second electromagnetic radiations are the same or are not the same.

Figure 1:
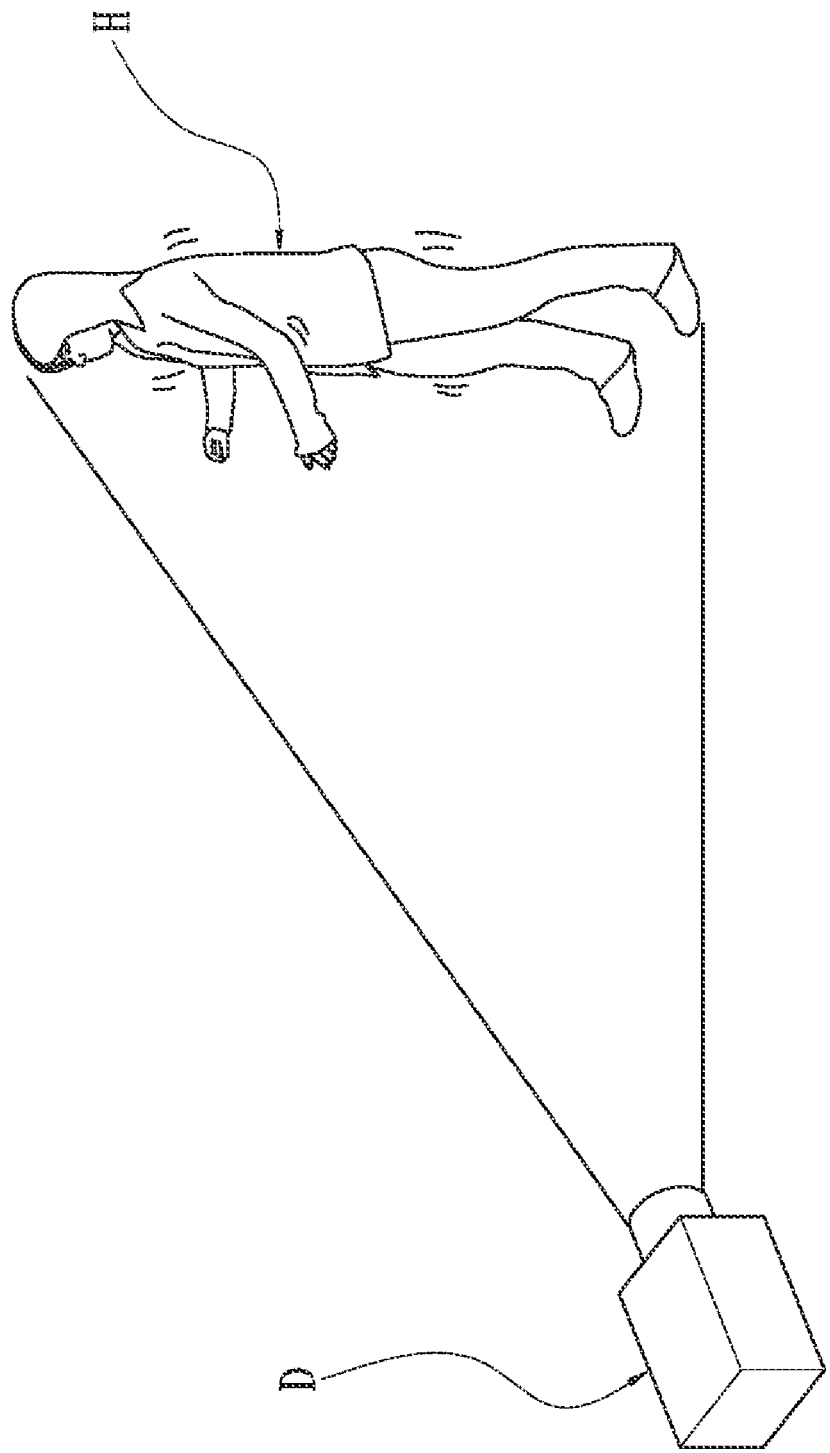
FIG. 1 is a perspective, schematic view of a 3D multi-degree of freedom detecting device of the prior art.
Figure 2B:
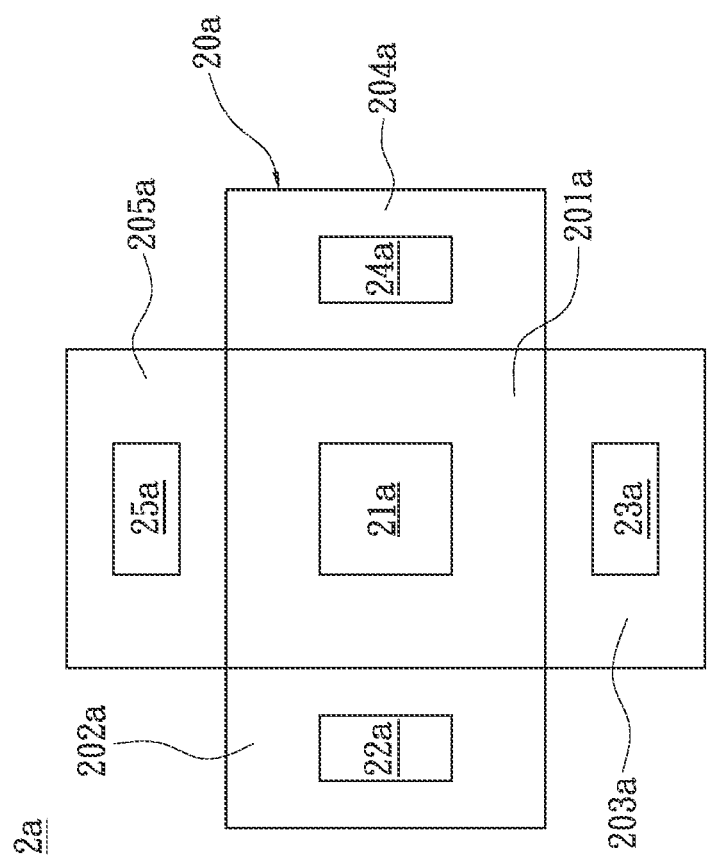
FIG. 2B is a top, schematic view of a first sensing module of the first embodiment of the present invention.
Figure 2A:
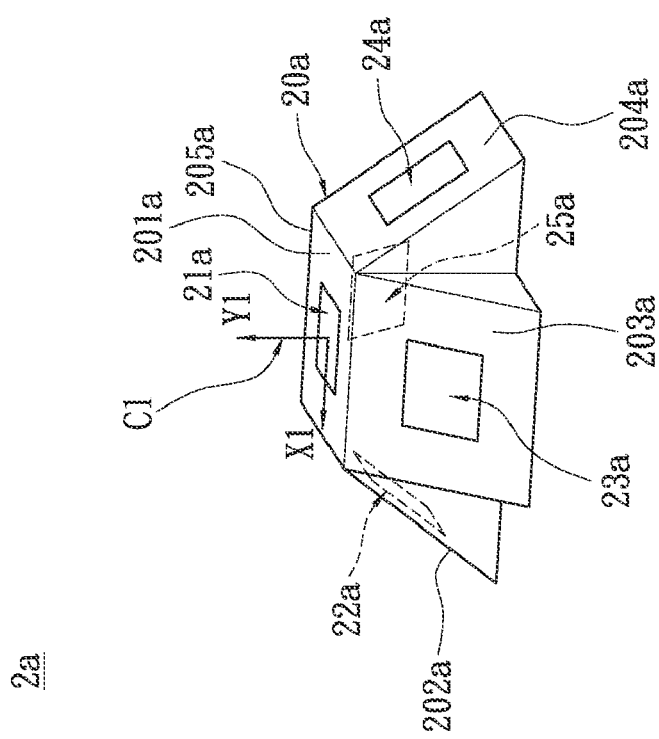
FIG. 2A is a perspective, schematic view of a first sensing module of the first embodiment of the present invention.

Referring to FIGS. 2A and 2B, the first sensing module 2a has a first base 20a and five first sensing elements (21a, 22a, 23a, 24a, 25a). The first base 20a has a plurality of surfaces (201a, 202a, 203a, 204a, 205a) on different planes, and the first sensing elements (21a, 22a, 23a, 24a, 25a) are disposed on the surfaces (201a, 202a, 203a, 204a, 205a) of the first base 20a. Hence, from different spatial angles, the first sensing elements (21a, 22a, 23a, 24a, 25a) can receive different radiation energies generated by the first electromagnetic radiations 10a from the first electromagnetic radiation source 1 and the second electromagnetic radiations 10a' from the second electromagnetic radiation source 1'.

Referring to FIGS. 2C and 2D, the second sensing module 2b has a second base 20b and five second sensing elements (21b, 22b, 23b, 24b, 25b). The second base 20b has a plurality of surfaces (201b, 202b, 203b, 204b, 205b) on different planes, and the second sensing elements (21b, 22b, 23b, 24b, 25b) are disposed on the surfaces (201b, 202b, 203b, 204b, 205b) of the second base 20b. Hence, from different spatial angles, the second sensing elements (21b, 22b, 23b, 24b, 25b) can receive different radiation energies generated by the first electromagnetic radiations 10b from the first electromagnetic radiation source 1 and the second electromagnetic radiations 10b' from the second electromagnetic radiation source 1'.

However, for example the first sensing module 2a, the design with five first sensing elements (21a, 22a, 23a, 24a, 25a) of the first sensing module 2a is just one embodiment of the present invention. Hence, the number of the sensing elements does not limit the present invention. For example, more than three or five sensing elements can be used in the present invention. Moreover, the disclosure of the first base 20a and the surfaces (201a, 202a, 203a, 204a, 205a) on different planes does not limit the present invention. For example, the surfaces (201a, 202a, 203a, 204a, 205a) can be arranged on the same plane, so that the first sensing elements (21a, 22a, 23a, 24a, 25a) can receive different radiation energies generated by the first electromagnetic radiations 10a and the second electromagnetic radiations 10a' from different spatial angles by a waveguide.

Furthermore, in the first embodiment, the normal vector of the first sensing element 21a (the normal vector of the first sensing element 21a is a vector that is normal to the first sensing element 21a) of the first sensing module 2a is parallel to a reference axis Y1 of a spatial coordinate C1. The normal vectors of the other first sensing elements (22a, 23a, 24a, 25a) of the first sensing module 2a each are relative to the reference axis Y1 in order to generate corresponding included angles.

Moreover, in the first embodiment, the normal vector of the second sensing element 21b (the normal vector of the second sensing element 21b is a vector that is normal to the second sensing element 21b) of the second sensing module 2b is parallel to a reference axis Y2 of a spatial coordinate C2. The normal vectors of the other second sensing elements (22b, 23b, 24b, 25b) of the second sensing module 2b each are relative to the reference axis Y2 in order to generate corresponding included angles.

However, for example the first sensing module 2a, the description of the normal vector of the first sensing element 21a parallel to the reference axis Y1 of the spatial coordinate C1 does not limit the present invention. For example, according to different requirement the designer can make the normal vector of any one first sensing element parallel to the reference axis Y1 of the spatial coordinate C1, and the normal vectors of the other first sensing elements each are relative to the reference axis Y1 in order to generate corresponding included angles.

Figure 2E:
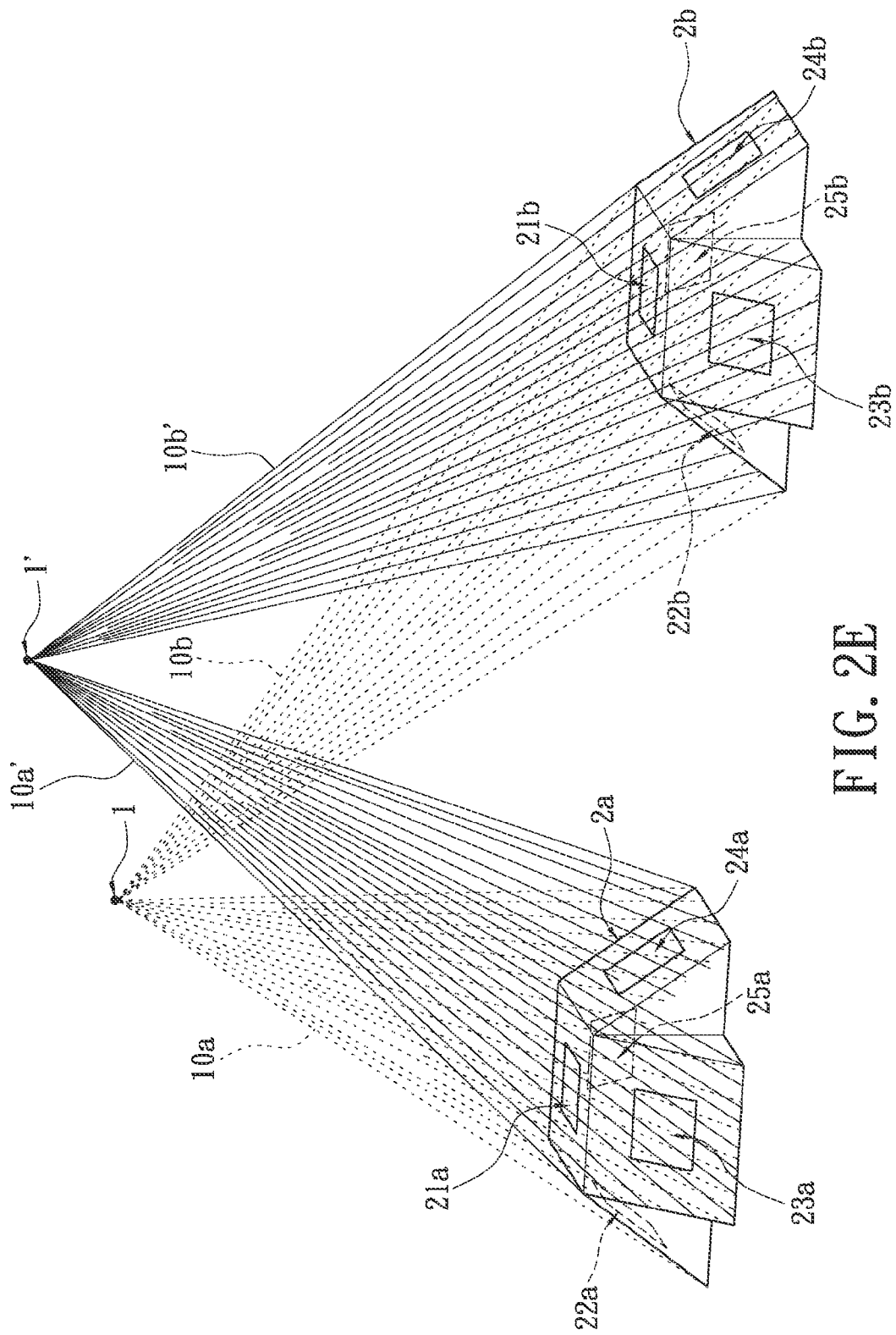
FIG. 2E is a perspective, schematic view of a 3D multi-degree of freedom detecting device of the first embodiment of the present invention.

Referring to FIG. 2E, the first sensing elements (21a, 22a, 23a, 24a, 25a) and the second sensing elements (21b, 22b, 23b, 24b, 25b) respectively receive different radiation energies from different spatial direction angles generated by the first electromagnetic radiation source 1 relative to the first sensing elements (21a, 22a, 23a, 24a, 25a) and the second sensing elements (21b, 22b, 23b, 24b, 25b), so that the values of a first spatial direction angle and a second spatial direction angle of the first electromagnetic radiation source 1 respectively relative to the first sensing module 2a and the second sensing module 2b are obtained according to the magnitude relationship of the radiation energies received by the first sensing module 2a and the second sensing module 2b and the difference between the first modulation signals of the first electromagnetic radiations (10a, 10b) and the second modulation signals of the second electromagnetic radiations (10a', 10b'). Moreover, a first spatial coordinate position of the first electromagnetic radiation source 1 relative to the first sensing module 2a and the second sensing module 2b is obtained according to the matrix operation of a first spatial distance, a second spatial distance, and the first and the second spatial direction angle of the first electromagnetic radiation source 1 respectively relative to the first sensing module 2a and the second sensing module 2b. The first spatial distance and the second spatial distance are respectively from the first electromagnetic radiation source 1 to the first sensing module 2a and the second sensing module 2b.

The first sensing elements (21a, 22a, 23a, 24a, 25a) and the second sensing elements (21b, 22b, 23b, 24b, 25b) respectively receive different radiation energies from different spatial direction angles generated by the second electromagnetic radiation source 1' relative to the first sensing elements (21a, 22a, 23a, 24a, 25a) and the second sensing elements (21b, 22b, 23b, 24b, 25b), so that the values of a first spatial direction angle and a second spatial direction angle of the second electromagnetic radiation source 1' respectively relative to the first sensing module 2a and the second sensing module 2b are obtained according to the magnitude relationship of the radiation energies received by the first sensing module 2a and the second sensing module 2b and the difference between the first modulation signals of the first electromagnetic radiations (10a, 10b) and the second modulation signals of the second electromagnetic radiations (10a', 10b'). Moreover, a second spatial coordinate position of the second electromagnetic radiation source 1' relative to the first sensing module 2a and the second sensing module 2b is obtained according to the matrix operation of a first spatial distance, a second spatial distance, and the first and the second spatial direction angle of the second electromagnetic radiation source 1' respectively relative to the first sensing module 2a and the second sensing module 2b. The first spatial distance and the second spatial distance are respectively from the second electromagnetic radiation source 1' to the first sensing module 2a and the second sensing module 2b.

Therefore, a line extended from the first spatial coordinate position to the second spatial coordinate position generate a linear vector in space, and rotation information of the linear vector in space is obtained according to the vector variation of the linear vector in space.

Figure 3:
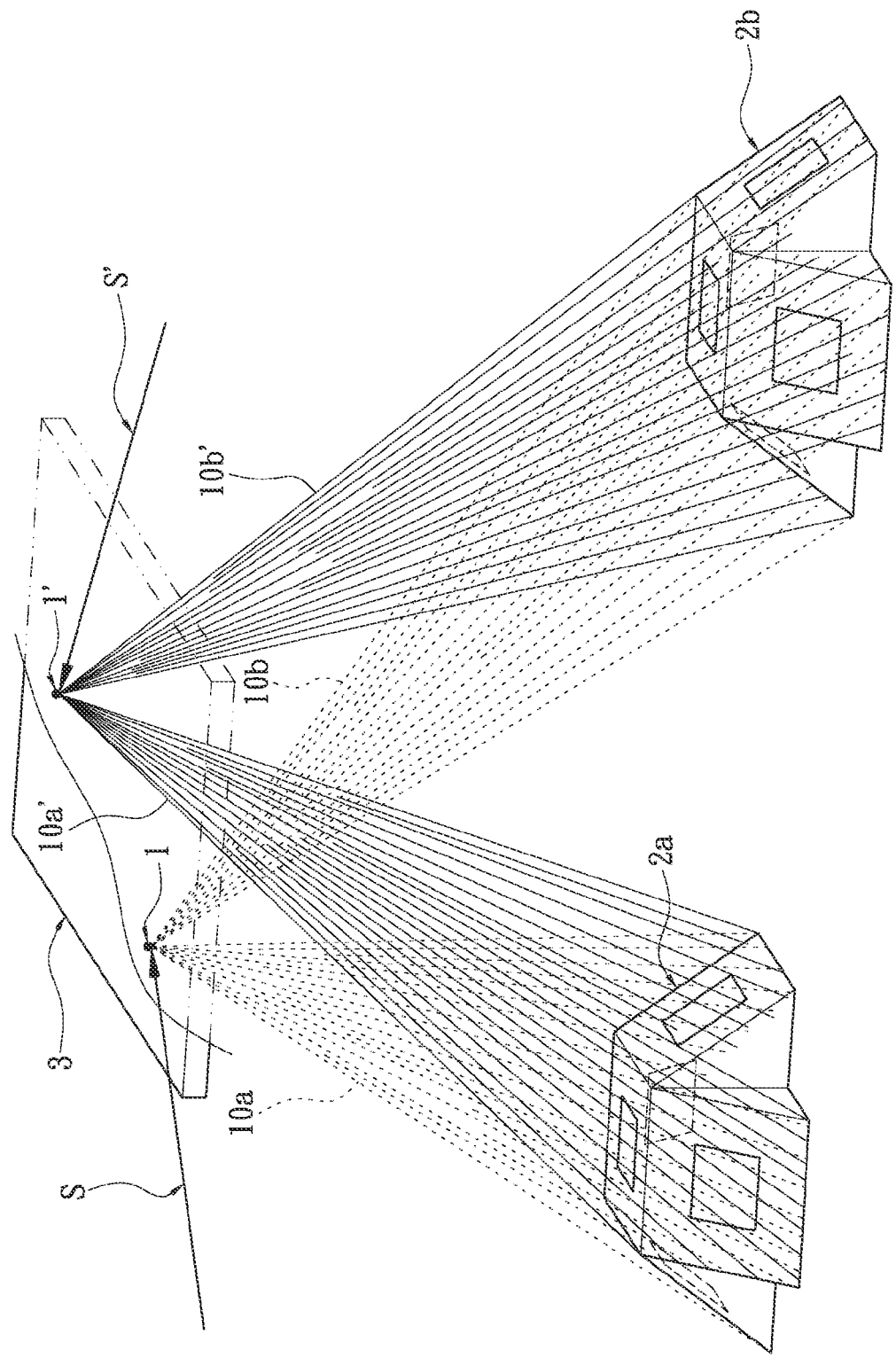
FIG. 3 is a perspective, schematic view of a 3D multi-degree of freedom detecting device of the second embodiment of the present invention.

Referring to FIG. 3, the difference between the second embodiment and the first embodiment is that: the second embodiment further includes a reflective board 3 for reflecting the first electromagnetic radiations (10a, 10b) from the first electromagnetic radiation source 1 and the second electromagnetic radiations (10a', 10b') from the second electromagnetic radiation source 1' onto the first sensing module 2a and the second sensing module 2b. Hence, the first electromagnetic radiations (10a, 10b) and the second electromagnetic radiations (10a', 10b') are generated by the reflective board 3. In other words, the light sources S, S' are arranged on the same side of the first sensing module 2a and the second sensing module 2b, and then the light sources S, S' are reflected by the reflective board 3 to generate the first electromagnetic radiation source 1 and its first electromagnetic radiations (10a, 10b) and the second electromagnetic radiation source 1' and its second electromagnetic radiations (10a', 10b').

Figure 4:
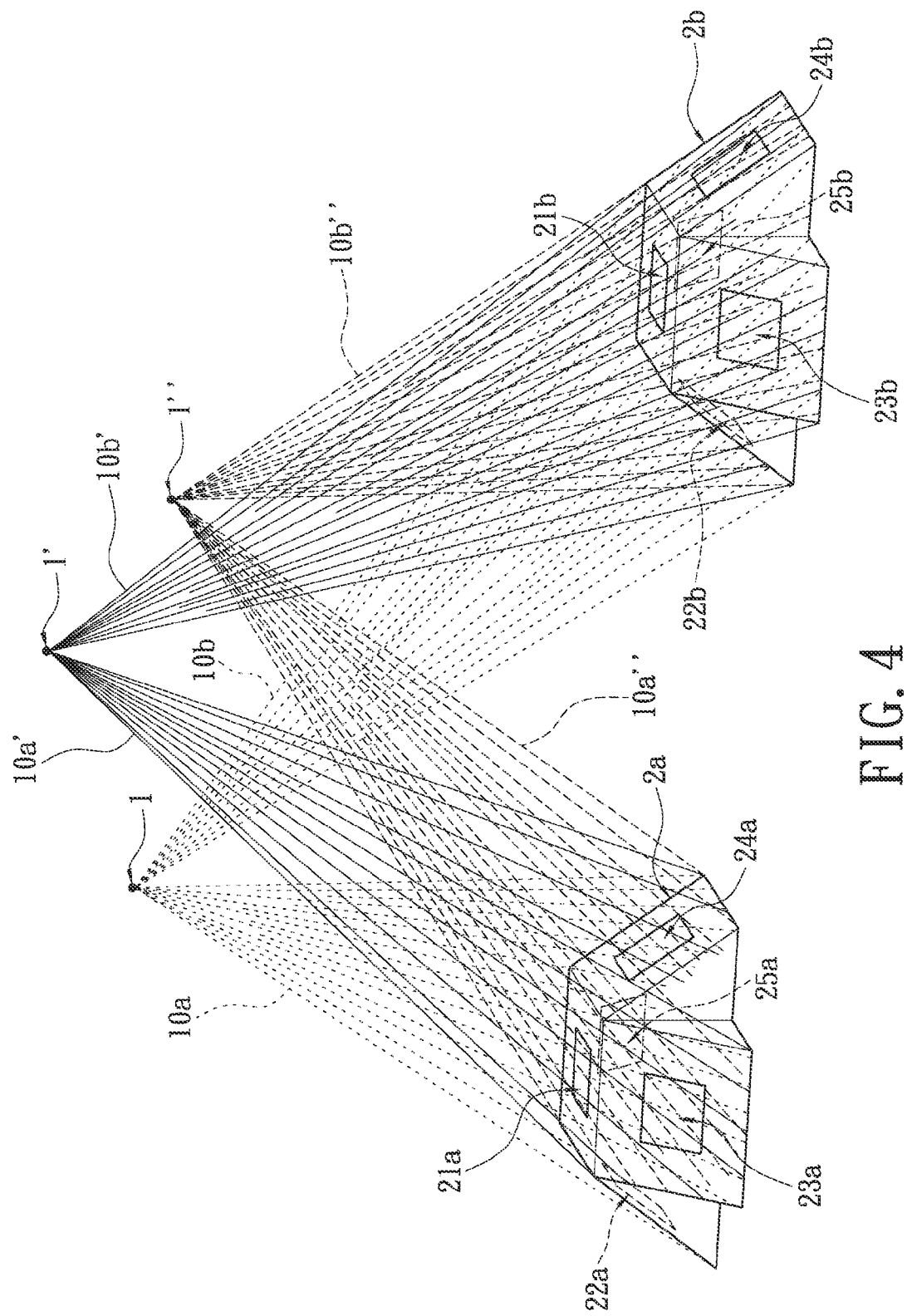
FIG. 4 is a perspective, schematic view of a 3D multi-degree of freedom detecting device of the third embodiment of the present invention.
Figure 5E:
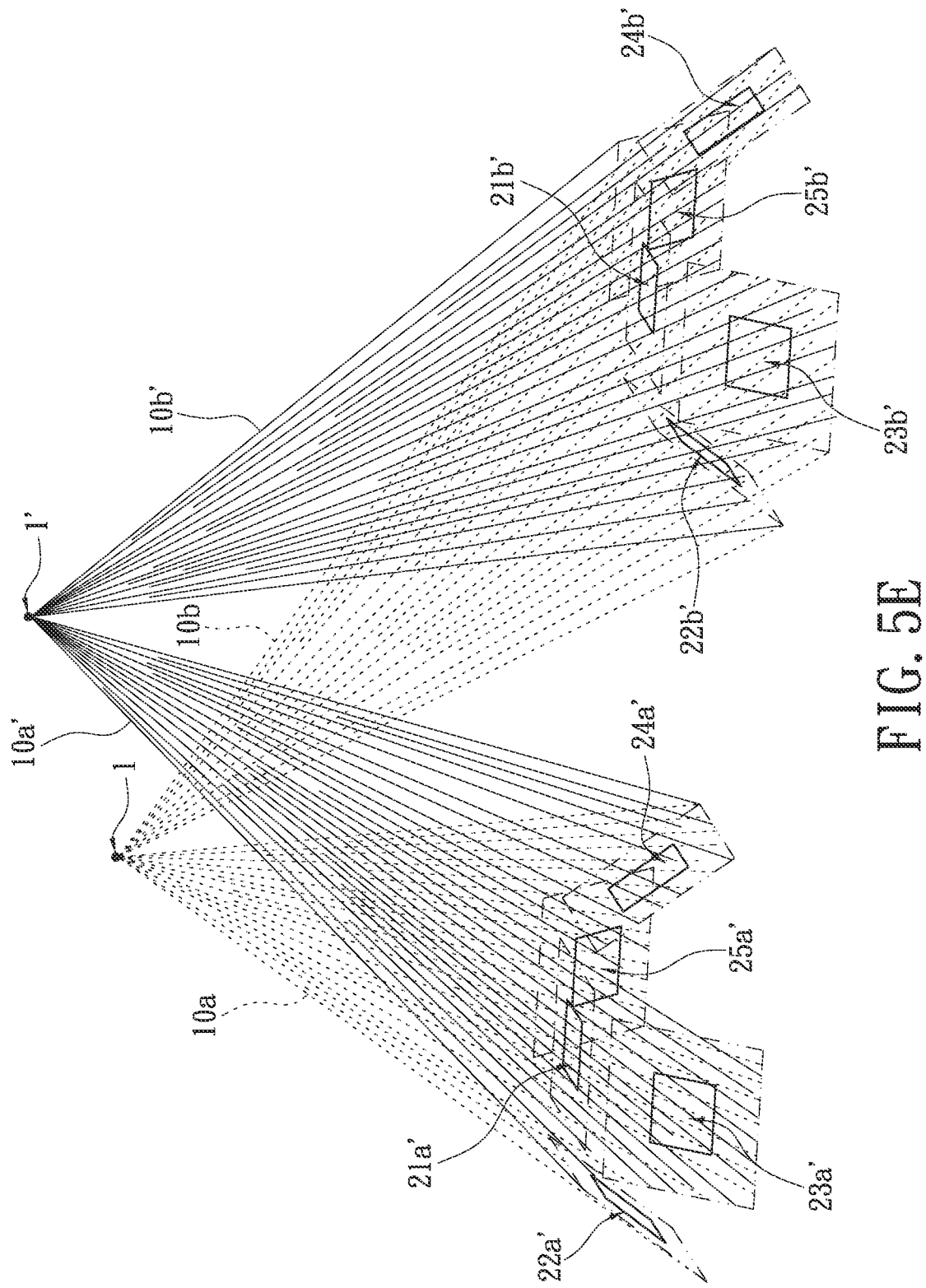
FIG. 5E is a perspective, schematic view of a 3D multi-degree of freedom detecting device of the fourth embodiment of the present invention.

Referring to FIG. 4, the difference between the third embodiment and the first embodiment is that: the third embodiment further includes a third electromagnetic radiation source 1" is used to generate third electromagnetic radiations (10a", 10b") having third modulation signals. The present invention can judge which electromagnetic radiations are received by sensing module according to the difference among the first, the second and the third electromagnetic radiations (10a, 10b, 10a', 10b', 10a", 10b").

The first sensing elements (21a, 22a, 23a, 24a, 25a) and the second sensing elements (21b, 22b, 23b, 24b, 25b) respectively receive different radiation energies from different spatial direction angles generated by the third electromagnetic radiation source 1" relative to the first sensing elements (21a, 22a, 23a, 24a, 25a) and the second sensing elements (21b, 22b, 23b, 24b, 25b), so that the values of a first spatial direction angle and a second spatial direction angle of the third electromagnetic radiation source 1" respectively relative to the first sensing module 2a and the second sensing module 2b are obtained according to the magnitude relationship of the radiation energies received by the first sensing module 2a and the second sensing module 2b and the difference among the first modulation signals of the first electromagnetic radiations (10a, 10b), the second modulation signals of the second electromagnetic radiations (10a', 10b') and the third modulation signals of the third electromagnetic radiations (10a", 10b"). Moreover, a third spatial coordinate position of the third electromagnetic radiation source 1" relative to the first sensing module 2a and the second sensing module 2b is obtained according to the matrix operation of a first spatial distance, a second spatial distance, and the first and the second spatial direction angle of the third electromagnetic radiation source 1" respectively relative to the first sensing module 2a and the second sensing module 2b. The first spatial distance and the second spatial distance are respectively from the third electromagnetic radiation source 1" to the first sensing module 2a and the second sensing module 2b.

Therefore, three lines extended from the first spatial coordinate position to the second spatial coordinate position, from the second spatial coordinate position to the third spatial coordinate position, and from the third spatial coordinate position to the first spatial coordinate position generate three linear vectors in space and a plane built by the three linear vectors, and rotation information of the plane in space is obtained according to the vector variation of any one linear vector in space and the normal vector variation of the plane.

Referring to FIGS. 5A to 5E, the difference between the fourth embodiment and the first embodiment is that: the fourth embodiment includes a first sensing module 2a' has five first sensing elements (21a', 22a', 23a', 24a', 25a') arranged on different planes (201a', 202a', 203a', 204a', 205a'), and the different planes (201a', 202a', 203a', 204a', 205a') are separated from each other. In other words, according to different requirements, the first sensing elements (21a', 22a', 23a', 24a', 25a') can be arranged on any different planes in spatial space, so that from different spatial angles the first sensing elements (21a', 22a', 23a', 24a', 25a') can receive different radiation energies generated by the first electromagnetic radiations 10a from the first electromagnetic radiation source 1 and the second electromagnetic radiations 10a' from the second electromagnetic radiation source 1'.

Moreover, the fourth embodiment includes a second sensing module 2b' has five second sensing elements (21b', 22b', 23b', 24b', 25b') arranged on different planes (201b', 202b', 203b', 204b', 205b'), and the different planes (201b', 202b', 203b', 204b', 205b') are separated from each other. In other words, according to different requirements, the second sensing elements (21b', 22b', 23b', 24b', 25b') can be arranged on any different planes in spatial space, so that from different spatial angles the second sensing elements (21b', 22b', 23b', 24b', 25b') can receive different radiation energies generated by the first electromagnetic radiations 10b from the first electromagnetic radiation source 1 and the second electromagnetic radiations 10b' from the second electromagnetic radiation source 1'.

FIGS. 6-1, 6-2 and 6-3, the first embodiment provides a method for using a 3D multi-degree of freedom detecting device. The method includes following steps:

Step S100 is: providing a first electromagnetic radiation source 1 for generating first electromagnetic radiations (10a, 10b), a second electromagnetic radiation source 1' for generating second electromagnetic radiations (10a', 10b'), a first sensing module 2a having a first base 20a and a plurality of first sensing elements (21a, 22a, 23a, 24a, 25a), and a second sensing module 2b having a second base 20b and a plurality of second sensing elements (21b, 22b, 23b, 24b, 25b), the first electromagnetic radiations 1 having first modulation signals, the second electromagnetic radiations 1' having second modulation signals, the first base 20a having a plurality of surfaces (201a, 202a, 203a, 204a, 205a) on different planes, the first sensing elements (21a, 22a, 23a, 24a, 25a) being disposed on the surfaces (201a, 202a, 203a, 204a, 205a) of the first base 20a, the second base 20b having a plurality of surfaces (201b, 202b, 203b, 204b, 205b) on different planes, and the second sensing elements (21b, 22b, 23b, 24b, 25b) being disposed on the surfaces (201b, 202b, 203b, 204b, 205b) of the second base 20b.

Step S102 is: using the first sensing elements (21a, 22a, 23a, 24a, 25) for receiving different radiation energies generated by the first electromagnetic radiations 10a and the second electromagnetic radiations 10a' from different spatial angles, the normal vector of the first sensing element 21a of the first sensing module 2a being parallel to a reference axis Y1 of a spatial coordinate C1, and the normal vectors of the other first sensing elements (22a, 23a, 24a, 25a) of the first sensing module 2a each are relative to the reference axis Y1 in order to generate corresponding included angles. Therefore, two first projection transformation matrixes are built by the first sensing module 2a relative to the first electromagnetic radiation source 1 and the second electromagnetic radiation source 1'.

Step S104 is: using the second sensing elements (21b, 22b, 23b, 24b, 25b) for receiving different radiation energies generated by the first electromagnetic radiations 10b and the second electromagnetic radiations 10b' from different spatial angles, the normal vector of the second sensing element 21b of the second sensing module 2b being parallel to a reference axis Y2 of a spatial coordinate C2, and the normal vectors of the other second sensing elements (22b, 23b, 24b, 25b) of the second sensing module 2b each are relative to the reference axis Y2 in order to generate corresponding included angles. Therefore, two second projection transformation matrixes are built by the second sensing module 2b relative to the first electromagnetic radiation source 1 and the second electromagnetic radiation source 1'.

In other words, the first sensing elements (21a, 22a, 23a, 24a, 25a) and the second sensing elements (21b, 22b, 23b, 24b, 25b) respectively receive different radiation energies from different spatial direction angles generated by the first electromagnetic radiation source 1 and the second electromagnetic radiation source 1' respectively relative to the first sensing elements (21a, 22a, 23a, 24a, 25a) and the second sensing elements (21b, 22b, 23b, 24b, 25b). The radiation energies received by the first sensing module 2a and the second sensing module 2b are luminous flux. In addition, for example, in the second embodiment as shown in FIG. 3, the steps S102 and S104 further include using a reflective board 3 for reflecting the first electromagnetic radiations (10a, 10b) from the first electromagnetic radiation source 1 and the second electromagnetic radiations (10a', 10b') from the second electromagnetic radiation source 1' onto the first sensing module 2a and the second sensing module 2b Step S106 is: selecting the radiation energies that are generated by the first and the second electromagnetic radiations (10a, 10a') and are received by one part of the first sensing elements and are higher than the radiation energies received by the other first sensing elements.

Step S108 is: selecting the radiation energies that are generated by the first and the second electromagnetic radiations (10b, 10b') and are received by one part of the second sensing elements and are higher than the radiation energies received by the other second sensing elements.

Step S110 is: the value of two first spatial direction angles of the first electromagnetic radiation source 1 and the second electromagnetic radiation source 1' relative to the first sensing module 2a is figured out according to the matrix operation of the radiation energies received by the one part of the first sensing elements and the two first projection transformation matrixes built by the first sensing module 2a relative to the first electromagnetic radiation source 1 and the second electromagnetic radiation source 1'.

Step S112 is: the value of two second spatial direction angles of the first electromagnetic radiation source 1 and the second electromagnetic radiation source 1' relative to the first sensing module 2b is figured out according to the matrix operation of the radiation energies received by the one part of the second sensing elements and the two second projection transformation matrixes built by the second sensing module 2b relative to the first electromagnetic radiation source 1 and the second electromagnetic radiation source 1'.

In other words, in the steps of S110 and S112, the values of the two first spatial direction angles of the first electromagnetic radiation source 1 and the second electromagnetic radiation source 1' relative to the first sensing module 2a are respectively figured out according to the magnitude relationship of the radiation energies received by the first sensing module 2a and the second sensing module 2b. The values of the two second spatial direction angles of the first electromagnetic radiation source 1 and the second electromagnetic radiation source 1' relative to the second sensing module 2b are respectively figured out according to the magnitude relationship of the radiation energies received by the first sensing module 2a and the second sensing module 2b.

Step S114 is: figuring out two first spatial distances respectively from the first electromagnetic radiation source 1 and the second electromagnetic radiation source 1' to the first sensing module 2a.

Step S116 is: figuring out two second spatial distances respectively from the first electromagnetic radiation source 1 and the second electromagnetic radiation source 1' to the second sensing module 2b.

Step S118 is: obtaining a first spatial coordinate position of the first electromagnetic radiation source 1 relative to the first sensing module 2a and the second sensing module 2b according to the matrix operation of the two spatial distances (the first spatial distance and the second spatial distance) and the two spatial direction angles (the first spatial direction angle and the second spatial direction angle) of the first electromagnetic radiation source 1 relative to the first sensing module 2a and the second sensing module 2b; the two spatial distances being from the first electromagnetic radiation source 1 to the first sensing module 2a and the second sensing module 2b.

Step S120 is: obtaining a second spatial coordinate position of the second electromagnetic radiation source 1' relative to the first sensing module 2a and the second sensing module 2b according to the matrix operation of the two spatial distances (the first spatial distance and the second spatial distance) and the two spatial direction angles (the first spatial direction angle and the second spatial direction angle) of the second electromagnetic radiation source 1' relative to the first sensing module 2a and the second sensing module 2b; the two spatial distances being from the second electromagnetic radiation source 1' to the first sensing module 2a and the second sensing module 2b.

Step S122 is: generating a linear vector in space by a line extended from the first spatial coordinate position to the second spatial coordinate position, and obtaining rotation information of the linear vector in space according to the vector variation of the linear vector in space.

Figures 2, 6:
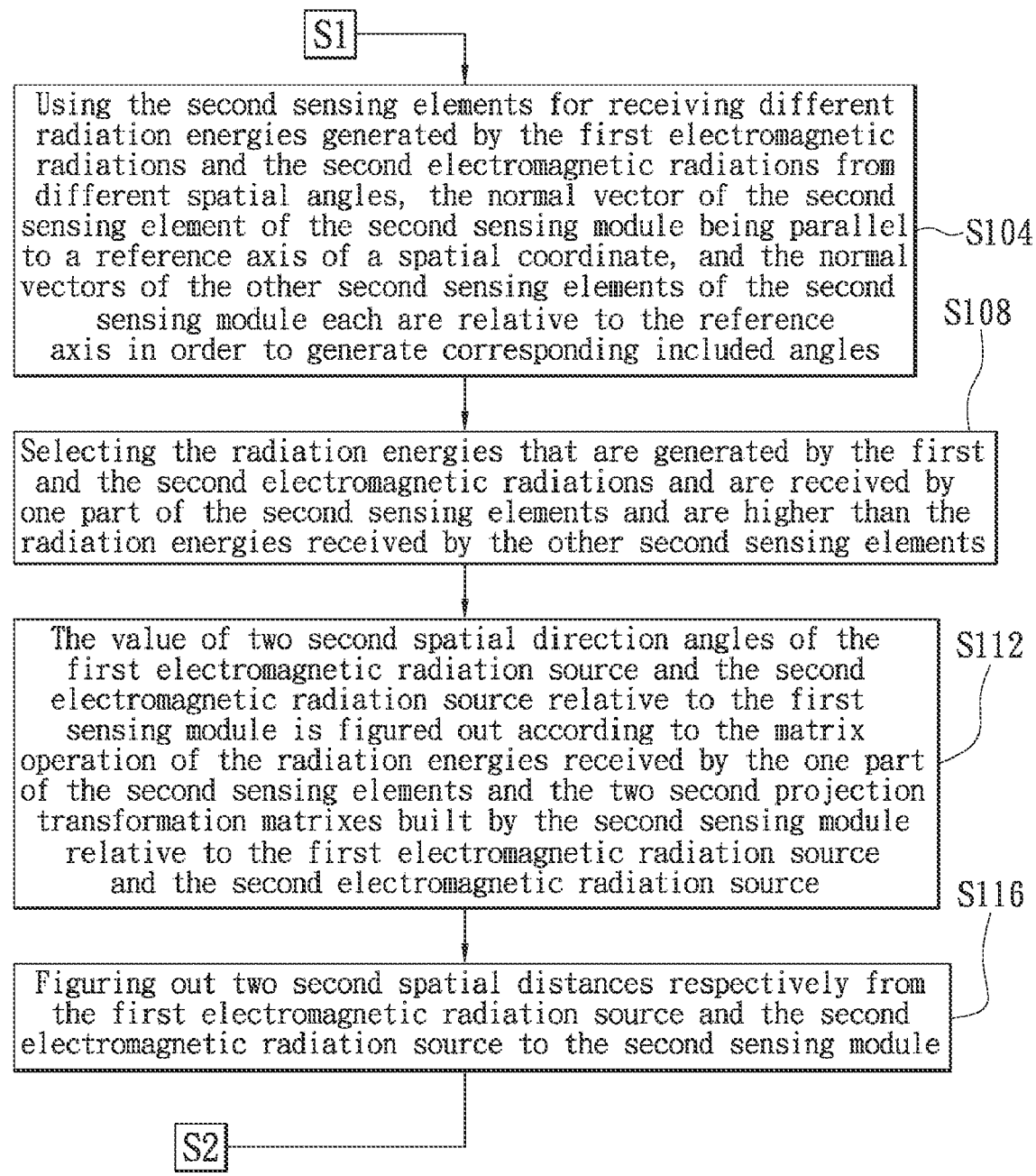
Figures 3, 6:
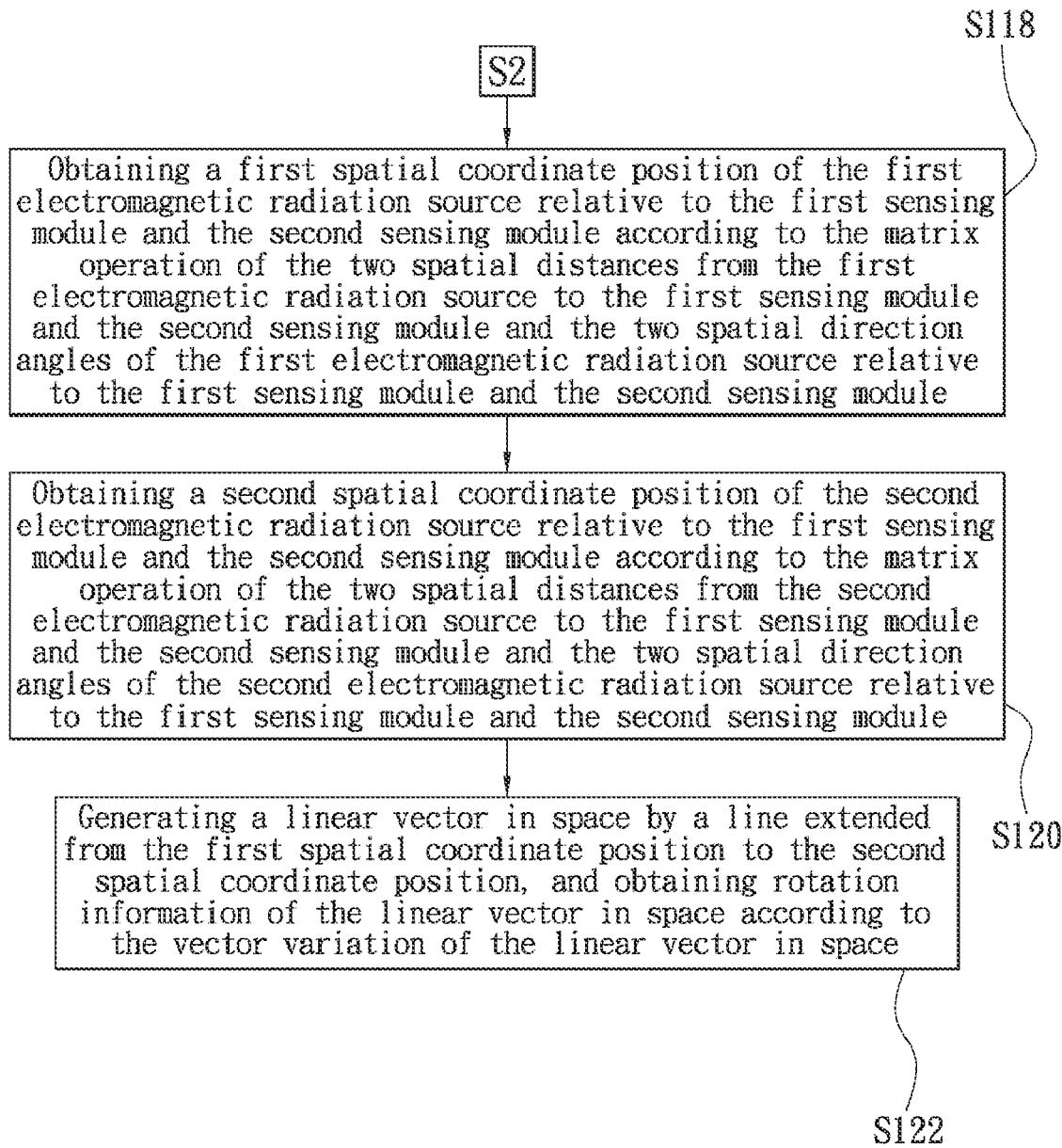
Figure 6A:
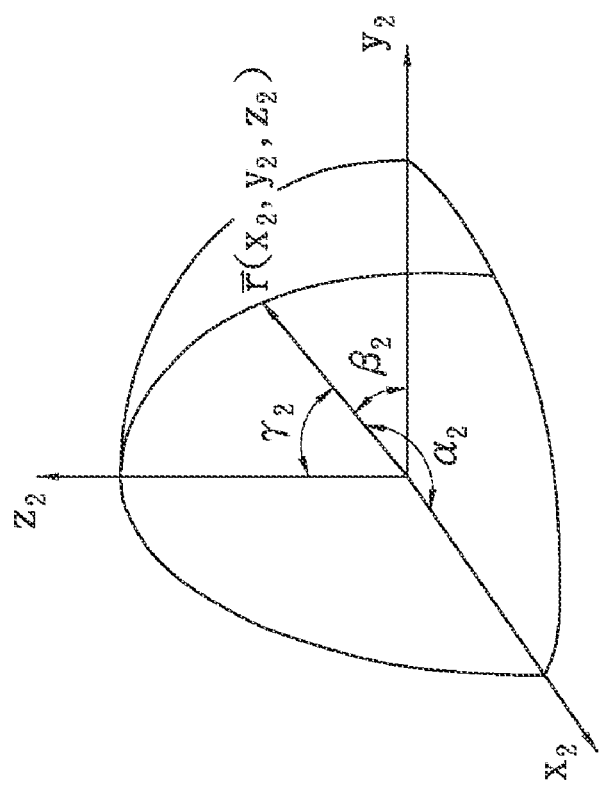
FIG. 6A is a 3D coordinate schematic diagram of a first electromagnetic radiation source relative to the first sensing module.
Figure 6B:
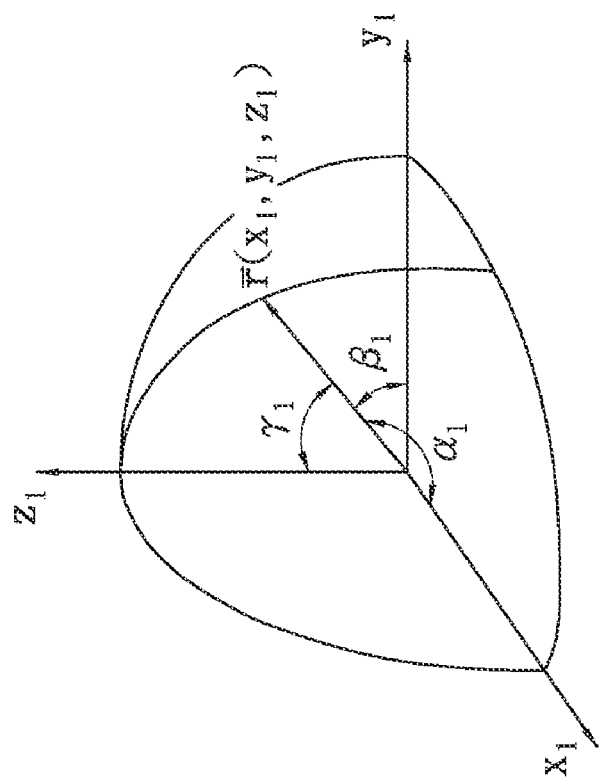
FIG. 6B is a 3D coordinate schematic diagram of a first electromagnetic radiation source relative to the second sensing module.

Referring to FIGS. 6A to 6D, the detailed description from the steps S102 to S122 is shown as follows:

Firstly, referring to FIGS. 6A and 6B, $\alpha_{ij}=f(P,A,r,\vec{n})$ is defined in order to obtain a first projection transformation matrix built by the first sensing module 2a relative to the first electromagnetic radiation source 1 and obtain a second projection transformation matrix built by the second sensing module 2b relative to the first electromagnetic radiation source 1. Moreover, $\alpha_{ij}$=the function of source emitting power; P=source emitting power; A=the area of projection; r=the distance between the source emitting point and the area of projection; and $\vec{n}$ =the normal vector of the area of projection.

Secondly, for example, three radiation energies ($I_1$, $I_2$, $I_3$) being received by one part of the first sensing elements of the first sensing module 2a and being higher than the radiation energies received by the other first sensing elements of the first sensing module 2a are taken out.

Therefore, $$\begin{bmatrix} a_{11} & a_{12} & a_{13} \\ a_{21} & a_{22} & a_{23} \\ a_{31} & a_{32} & a_{33} \end{bmatrix} \begin{bmatrix} b_{11} \\ b_{21} \\ b_{31} \end{bmatrix} = \begin{bmatrix} I_1 \\ I_2 \\ I_3 \end{bmatrix} \Rightarrow AB$$
$$= I \Rightarrow B$$
$$= A^{-1}I;$$

Moreover, A=3D projection transformation matrix; B=3D directional angle matrix; and I=intensity matrix. Hence, the value of the first spatial direction angle of the first electromagnetic radiation source 1 relative to the first sensing module 2a is figured out according to the matrix operation of the radiation energies received by the one part of the first sensing elements and the first projection transformation matrix built by the first sensing module 2a relative to the first electromagnetic radiation source 1. In other words, because A (the first projection transformation matrix built by the first sensing module 2a relative to the first electromagnetic radiation source 1) and I (the radiation energies received by the one part of the first sensing elements) are known, B (3D directional angle matrix) is obtained. Hence, the value of the first spatial direction angle $b_{ij}=g(\alpha_1, \beta_1, \gamma_1)$ of the first electromagnetic radiation source 1 relative to the first sensing module 2a is figured out, and $b_{ij}$ is the function of direction cosine angles of $\alpha_1, \beta_1, \gamma_1$. Using the same calculation way, the value of the second spatial direction angle $b_{ij}=g(\alpha_2, \beta_2, \gamma_2)$ of the first electromagnetic radiation source 1 relative to the second sensing module 2b is figured out, and by is the function of direction cosine angles of $\alpha_2, \beta_2, \gamma_2$.

Figure 6C:
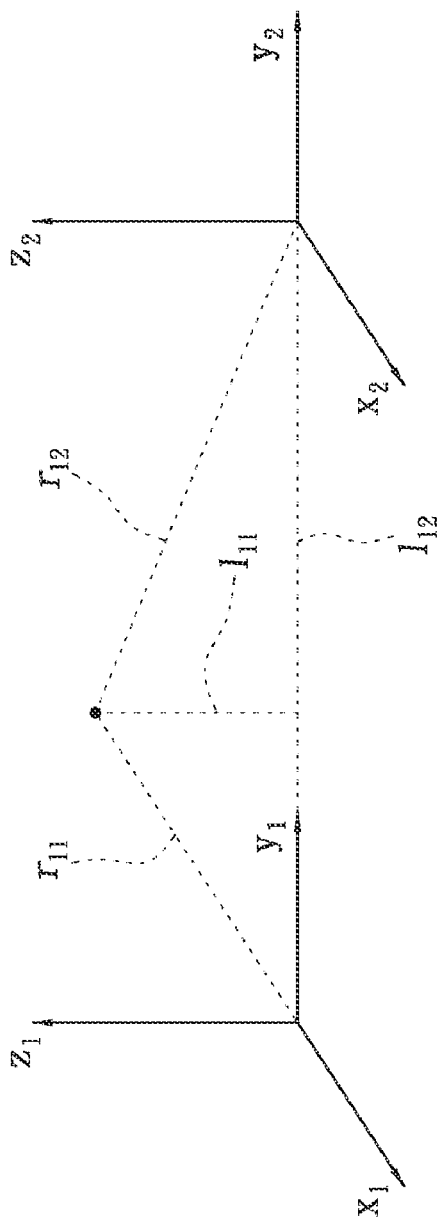
FIG. 6C is a 2D projection coordinate schematic diagram of a first electromagnetic radiation source relative to the first sensing module and the second sensing module.

Furthermore, referring to FIG. 6C, a first spatial distance respectively from the first electromagnetic radiation source 1 to the first sensing module $2a$ is figured out and a second spatial distance respectively from the first electromagnetic radiation source $1$ to the second sensing module $2b$ figured out.

Hence, $$\begin{bmatrix} c_{11} & c_{12} \\ c_{21} & c_{22} \end{bmatrix} \begin{bmatrix} r_{11} \\ r_{12} \end{bmatrix} = \begin{bmatrix} l_{11} \\ l_{12} \end{bmatrix} \Rightarrow CR$$
$$= L \Rightarrow R$$
$$= C^{-1}L;$$

Moreover, C=2D projection transformation matrix; A=source emitting distance matrix; and L=sensing module distance matrix. Because C (2D projection transformation matrix generated by the first electromagnetic radiation source $1$ relative to the first sensing elements $2a$ and the second sensing elements $2b$) and L (the y-direction distance $l_{11}$ between the first sensing elements $2a$ and the second sensing elements $2b$, and z-direction distance $l_{12}$ from the first electromagnetic radiation source $1$ to the first sensing elements $2a$ or the second sensing elements $2b$) are known, R (source emitting distance matrix) is obtained. In addition, $r_{11}$ is the first spatial distance respectively from the first electromagnetic radiation source $1$ to the first sensing module $2a$, and $r_{12}$ is the second spatial distance respectively from the first electromagnetic radiation source $1$ to the second sensing module $2b$.

Moreover, a first spatial coordinate position of the first electromagnetic radiation source $1$ relative to the first sensing module $2a$ and the second sensing module $2b$ is obtained according to the matrix operation of the two spatial distances (the first spatial distance $r_{11}$ and the second spatial distance $r_{12}$) and the two spatial direction angles (the first spatial direction angle $(\alpha_1, \beta_1, \gamma_1)$ and the second spatial direction angle $(\alpha_2, \beta_2, \gamma_2)$). In other words, the first spatial coordinate position $(x_1, y_1, z_1)$ of the first electromagnetic radiation source $1$ relative to the first sensing module $2a$ and the second spatial coordinate position $(x_2, y_2, z_2)$ of the first electromagnetic radiation source $1$ relative to the second sensing module $2b$ respectively are:

$x_1 = r_{11} \cos(\alpha_1), y_1 = r_{11} \cos(\beta_1), z_1 = r_{11} \cos(\gamma_1)$; and $x_2 = r_{12} \cos(\alpha_2), y_2 = r_{12} \cos(\beta_2), z_2 = r_{12} \cos(\gamma_2)$.

Furthermore, the two second spatial coordinate positions of the second electromagnetic radiation source $1'$ relative to the first sensing module $2a$ and the second sensing module $2b$ are figured out according to the above-mentioned steps as shown in FIGS. 6A-6C.

Figure 6D:
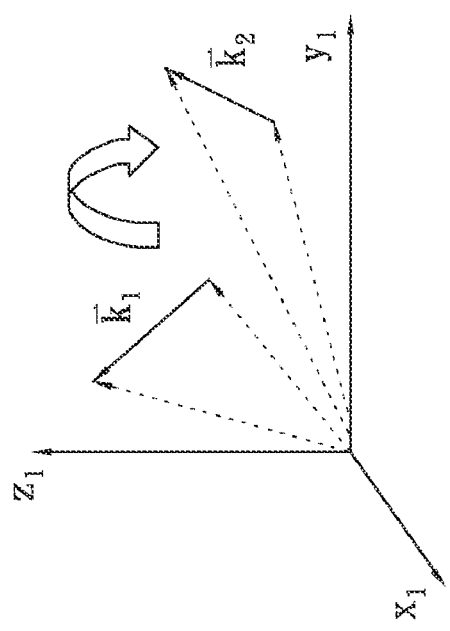
FIG. 6D is a 3D coordinate schematic diagram of a line rotated in spatial.

Finally, referring to FIG. 6D, for example the first sensing module $2a$ is a center, a line extended from the first spatial coordinate position of the first electromagnetic radiation source $1$ relative to the first sensing module $2a$ to the second spatial coordinate position of the second electromagnetic radiation source $1'$ relative to the first sensing module $2a$ generate a linear vector $\vec{k}_1$ in spatial (it means the linear vector in space is obtained by the line extended from the first spatial coordinate position to the second spatial coordinate position), and obtaining rotation information (from $\vec{k}_1$ to $\vec{k}_2$) of the linear vector $\vec{k}_1$ in space according to the vector variation $\Delta \vec{k}$ of the linear vector $\vec{k}_1$ in space when $\vec{k}_1$ is rotated to $\vec{k}_2$. In other words, the rotation information of the linear vector $\vec{k}_1$ in space is obtained by $\Delta \vec{k} = \vec{k}_2 - \vec{k}_1$, in addition $\Delta \vec{k}$ is the vector variation, $\vec{k}_1 = \vec{r}_{11} - \vec{r}_{12}$ is a linear vector before $\vec{k}_1$ has not been rotated yet, and $\vec{k}_2 = \vec{r}_{21} - \vec{r}_{22}$ is a linear vector after $\vec{k}_1$ has been rotated.

Referring to FIGS. 4, 7-1, 7-2 and 7A, the second embodiment provides a method for using a 3D multi-degree of freedom detecting device. The method includes following steps:

Step S200 is: providing a first electromagnetic radiation source $1$ for generating first electromagnetic radiations ($10a$, $10b$), a second electromagnetic radiation source $1'$ for generating second electromagnetic radiations ($10a'$, $10b'$), a third electromagnetic radiation source $1''$ for generating third electromagnetic radiations ($10a''$, $10b''$), a first sensing module $2a$ having a plurality of first sensing elements ($21a, 22a, 23a, 24a, 25a$), and a second sensing module $2b$ having a plurality of second sensing elements ($21b, 22b, 23b, 24b, 25b$), the first electromagnetic radiations $1$ having first modulation signals, the second electromagnetic radiations $1'$ having second modulation signals, and the third electromagnetic radiations $1''$ having second modulation signals.

Step S202 is: using the first sensing elements and the second sensing elements respectively receive different radiation energies from different spatial direction angles generated by the first electromagnetic radiations ($10a, 10b$) from the first electromagnetic radiation source $1$, the second electromagnetic radiations ($10a', 10b'$) from the second electromagnetic radiation source $1'$ and the third electromagnetic radiations ($10a'', 10b''$) from the third electromagnetic radiation source $1''$, from different spatial angles.

Step S204 is: obtaining the values of three first spatial direction angles of the first, the second and the third electromagnetic radiation sources ($1, 1', 1''$) relative to the first sensing module $2a$ according to the magnitude relationship of the radiation energies of the first, the second and the third electromagnetic radiation sources ($1, 1', 1''$) received by the first sensing module $2a$.

Step S206 is: obtaining the values of three second spatial direction angles of the first, the second and the third electromagnetic radiation sources ($1, 1', 1''$) relative to the second sensing module $2b$ according to the magnitude relationship of the radiation energies of the first, the second and the third electromagnetic radiation sources ($1, 1', 1''$) received by the second sensing module $2b$.

Step S208 is: obtaining a first spatial coordinate position of the first electromagnetic radiation source $1$ relative to the first sensing module $2a$ and the second sensing module $2b$ according to the matrix operation of a first spatial distance, a second spatial distance, and the first spatial direction angle and the second spatial direction of the first electromagnetic radiation source $1$ relative to the first sensing module $2a$ and the second sensing module $2b$; the first spatial distance and the second spatial distance being from the first electromagnetic radiation source $1$ to the first sensing module $2a$ and the second sensing module $2b$.

Step S210 is: obtaining a second spatial coordinate position of the second electromagnetic radiation source $1'$ relative to the first sensing module $2a$ and the second sensing module $2b$ according to the matrix operation of a first spatial distance, a second spatial distance, and the first spatial direction angle and the second spatial direction of the second electromagnetic radiation source $1'$ relative to the first sensing module $2a$ and the second sensing module $2b$; the first spatial distance and the second spatial distance being from the second electromagnetic radiation source 1' to the first sensing module 2a and the second sensing module 2b.

Step S212 is: obtaining a third spatial coordinate position of the third electromagnetic radiation source 1" relative to the first sensing module 2a and the second sensing module 2b according to the matrix operation of a first spatial distance, a second spatial distance, and the first spatial direction angle and the second spatial direction of the third electromagnetic radiation source 1" relative to the first sensing module 2a and the second sensing module 2b; the first spatial distance and the second spatial distance being from the third electromagnetic radiation source 1" to the first sensing module 2a and the second sensing module 2b.

Figure 7A:
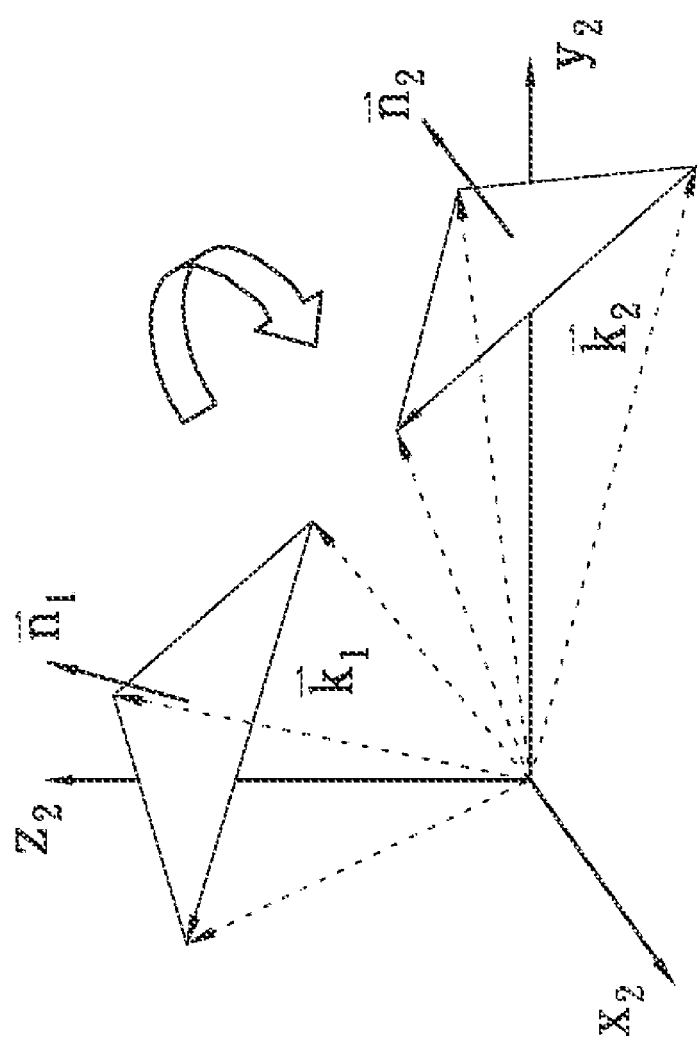
FIG. 7A is a 3D coordinate schematic diagram of a plane rotated in spatial.

Step S214 is: referring to FIG. 7A, generating three linear vectors in space and a plane built by the three linear vectors by three lines extended from the first spatial coordinate position to the second spatial coordinate position, from the second spatial coordinate position to the third spatial coordinate position, and from the third spatial coordinate position to the first spatial coordinate position, and obtaining rotation information (from $\vec{k}_1$ to $\vec{k}_2$) of the plane in space according to the vector variation $\Delta \vec{k} = \vec{k}_2 - \vec{k}_1$ ($\vec{k}_1 = \vec{r}_{11} - \vec{r}_{12}$ is a linear vector before $\vec{k}_1$ has not been rotated yet, and $\vec{k}_2 = \vec{r}_{21} - \vec{r}_{22}$ is a linear vector after $\vec{k}_1$ has been rotated) of any one linear vector in space and the normal vector variation $\Delta \vec{n} = \vec{n}_2 - \vec{n}_1$ ($\vec{n}_1$ is a normal vector before $\vec{k}_1$ has not been rotated yet, and $\vec{n}_2$ is a normal vector after $\vec{k}_1$ has been rotated) of the plane.

In conclusion, the present invention can be used to detect two degrees of rotational freedom and three degrees of linear freedom of the 3D multi-degree of freedom detecting device in space by matching at least two electromagnetic radiation sources for generating electromagnetic radiations and at least two sensing modules having a plurality of sensing elements. In addition, the present invention can be used to detect three degrees of rotational freedom and three degrees of linear freedom of the 3D multi-degree of freedom detecting device in space by matching at least three electromagnetic radiation sources for generating electromagnetic radiations and at least two sensing modules having a plurality of sensing elements.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A 3D multi-degree of freedom detecting device, comprising:
   a first electromagnetic radiation source for generating first electromagnetic radiations, wherein the first electromagnetic radiation source is a point source;
   a second electromagnetic radiation source for generating second electromagnetic radiations, wherein the second electromagnetic radiation source is a point source;
   a first sensing module having a plurality of first sensing elements for receiving different radiation energies generated by the first electromagnetic radiations and the second electromagnetic radiations from different spatial angles, the first sensing module including a first base that has a plurality of surfaces on different planes, and the first sensing elements being disposed on the surfaces of the first base;
   a second sensing module having a plurality of second sensing elements for receiving different radiation energies generated by the first electromagnetic radiations and the second electromagnetic radiations from different spatial angles, the second sensing module including a second base that has a plurality of surfaces on different planes, and the second sensing elements being disposed on the surfaces of the second base;
   wherein, the first sensing elements and the second sensing elements respectively receive different radiation energies from different spatial direction angles generated by the first electromagnetic radiation source relative to the first sensing elements and the second sensing elements, so that the values of a first spatial direction angle and a second spatial direction angle of the first electromagnetic radiation source respectively relative to the first sensing module and the second sensing module are obtained according to the magnitude relationship of the radiation energies received by the first sensing module and the second sensing module; a first spatial coordinate position of the first electromagnetic radiation source relative to the first sensing module and the second sensing module is obtained according to the matrix operation of a first spatial distance, a second spatial distance, and the first spatial direction angle and the second spatial direction angle of the first electromagnetic radiation source respectively relative to the first sensing module and the second sensing module; the first spatial distance and the second spatial distance are respectively from the first electromagnetic radiation source to the first sensing module and the second sensing module;
   wherein, the first sensing elements and the second sensing elements respectively receive different radiation energies from different spatial direction angles generated by the second electromagnetic radiation source relative to the first sensing elements and the second sensing elements, so that the values of a first spatial direction angle and a second spatial direction angle of the second electromagnetic radiation source respectively relative to the first sensing module and the second sensing module are obtained according to the magnitude relationship of the radiation energies received by the first sensing module and the second sensing module; a second spatial coordinate position of the second electromagnetic radiation source relative to the first sensing module and the second sensing module is obtained according to the matrix operation of a first spatial distance, a second spatial distance, and the first spatial direction angle and the second spatial direction angle of the second electromagnetic radiation source respectively relative to the first sensing module and the second sensing module; the first spatial distance and the second spatial distance are respectively from the second electromagnetic radiation source to the first sensing module and the second sensing module;
   wherein, a line extended from the first spatial coordinate position to the second spatial coordinate position generate a linear vector in space, and rotation information of the linear vector in space is obtained according to the vector variation of the linear vector in space.

2. The 3D multi-degree of freedom detecting device as claimed in claim 1, wherein the first electromagnetic radiation source and the second electromagnetic radiation source emit visible light or invisible light.

3. The 3D multi-degree of freedom detecting device as claimed in claim 1, wherein the normal vector of one of the first sensing elements is parallel to a reference axis of a spatial coordinate, and the normal vectors of the other first sensing elements each are relative to the reference axis in order to generate corresponding included angles.

4. The 3D multi-degree of freedom detecting device as claimed in claim 1, wherein the normal vector of one of the second sensing elements is parallel to a reference axis of a spatial coordinate, and the normal vectors of the other second sensing elements each are relative to the reference axis in order to generate corresponding included angles.

5. The 3D multi-degree of freedom detecting device as claimed in claim 1, further comprising a reflective board for reflecting the first electromagnetic radiations and the second electromagnetic radiations onto the first sensing module and the second sensing module.

6. The 3D multi-degree of freedom detecting device as claimed in claim 1, wherein the first electromagnetic radiations has first modulation signals, the second electromagnetic radiations have second modulation signals, and the first modulation signals and the second modulation signals are amplitude modulation, frequency modulation or phase modulation.

7. The 3D multi-degree of freedom detecting device as claimed in claim 1, wherein the wavelength of the first electromagnetic radiations and the second electromagnetic radiations are the same or are not the same.

8. The 3D multi-degree of freedom detecting device as claimed in claim 1, wherein the first sensing elements and the second sensing elements are disposed on the same plane in space.

9. A method for using a 3D multi-degree of freedom detecting device, comprising:
(a) providing a first electromagnetic radiation source for generating first electromagnetic radiations, a second electromagnetic radiation source for generating second electromagnetic radiations, a first sensing module having a plurality of first sensing elements, and a second sensing module having a plurality of second sensing elements, wherein the first and the electromagnetic radiation sources are point sources, wherein the first sensing module includes a first base that has a plurality of surfaces on different planes and the first sensing elements are disposed on the surfaces of the first base, and wherein the second sensing module includes a second base that has a plurality of surfaces on different planes and the second sensing elements are disposed on the surfaces of the second base;
(b) using the first sensing elements and the second sensing elements for receiving different radiation energies generated by the first electromagnetic radiations from the first electromagnetic radiation source and the second electromagnetic radiations from the second electromagnetic radiation source from different spatial angles;
(c) obtaining the values of two first spatial direction angles of the first electromagnetic radiation source respectively relative to the first sensing module and the second sensing module according to the magnitude relationship of the radiation energies received by the first sensing module and the second sensing module;
(d) obtaining the values of two second spatial direction angles of the second electromagnetic radiation source respectively relative to the first sensing module and the second sensing module according to the magnitude relationship of the radiation energies received by the first sensing module and the second sensing module;
(e) obtaining a first spatial coordinate position of the first electromagnetic radiation source relative to the first sensing module and the second sensing module according to the matrix operation of a first spatial distance, a second spatial distance, and the first spatial direction angle and the second spatial direction of the first electromagnetic radiation source relative to the first sensing module and the second sensing module, wherein the first spatial distance and the second spatial distance are respectively from the first electromagnetic radiation source to the first sensing module and the second sensing module;
(f) obtaining a second spatial coordinate position of the second electromagnetic radiation source relative to the first sensing module and the second sensing module according to the matrix operation of a first spatial distance, a second spatial distance, and the first spatial direction angle and the second spatial direction of the second electromagnetic radiation source relative to the first sensing module and the second sensing module, wherein the first spatial distance and the second spatial distance are respectively from the second electromagnetic radiation source to the first sensing module and the second sensing module; and
(g) generating a linear vector in space by a line extended from the first spatial coordinate position to the second spatial coordinate position, and obtaining rotation information of the linear vector in space according to the vector variation of the linear vector in space.

10. The method as claimed in claim 9, wherein the first electromagnetic radiation source and the second electromagnetic radiation source emit visible light or invisible light.

11. The method as claimed in claim 9, wherein the steps of (b) and (c) further comprises providing a reflective board for reflecting the first electromagnetic radiations and the second electromagnetic radiations onto the first sensing module and the second sensing module.

12. The method as claimed in claim 9, wherein the first electromagnetic radiations has first modulation signals, the second electromagnetic radiations have second modulation signals, and the first modulation signals and the second modulation signals are amplitude modulation, frequency modulation or phase modulation.

13. The method as claimed in claim 9, wherein the wavelength of the first electromagnetic radiations and the second electromagnetic radiations are the same or are not the same.

14. The method as claimed in claim 9, wherein the first sensing elements and the second sensing elements are disposed on the same plane in space.

15. A method for using a 3D multi-degree of freedom detecting device, comprising:
(a) providing a first electromagnetic radiation source for generating first electromagnetic radiations, a second electromagnetic radiation source for generating second electromagnetic radiations, a first sensing module having a plurality of first sensing elements, and a second sensing module having a plurality of second sensing elements, wherein the first and the electromagnetic radiation sources are point sources;
(b) using the first sensing elements and the second sensing elements for receiving different radiation energies generated by the first electromagnetic radiations from the first electromagnetic radiation source and the second electromagnetic radiations from the second electromagnetic radiation source from different spatial angles;
(c) obtaining the values of two first spatial direction angles of the first electromagnetic radiation source respectively relative to the first sensing module and the second sensing module according to the magnitude relationship of the radiation energies received by the first sensing module and the second sensing module;

(d) obtaining the values of two second spatial direction angles of the second electromagnetic radiation source respectively relative to the first sensing module and the second sensing module according to the magnitude relationship of the radiation energies received by the first sensing module and the second sensing module;

(e) obtaining a first spatial coordinate position of the first electromagnetic radiation source relative to the first sensing module and the second sensing module according to the matrix operation of a first spatial distance, a second spatial distance, and the first spatial direction angle and the second spatial direction of the first electromagnetic radiation source relative to the first sensing module and the second sensing module, wherein the first spatial distance and the second spatial distance are respectively from the first electromagnetic radiation source to the first sensing module and the second sensing module;

(f) obtaining a second spatial coordinate position of the second electromagnetic radiation source relative to the first sensing module and the second sensing module according to the matrix operation of a first spatial distance, a second spatial distance, and the first spatial direction angle and the second spatial direction of the second electromagnetic radiation source relative to the first sensing module and the second sensing module, wherein the first spatial distance and the second spatial distance are respectively from the second electromagnetic radiation source to the first sensing module and the second sensing module; and (g) generating a linear vector in space by a line extended from the first spatial coordinate position to the second spatial coordinate position, and obtaining rotation information of the linear vector in space according to the vector variation of the linear vector in space, wherein steps (b) to (d) further comprises comprise:

building two first projection transformation matrixes by the first sensing module respectively relative to the first electromagnetic radiation source and the second electromagnetic radiation source, wherein one of the normal vector of the first sensing element is parallel to a reference axis of a spatial coordinate, and normal vectors of the other first sensing elements each are relative to the reference axis in order to generate corresponding included angles;

building two second projection transformation matrixes by the second sensing module respectively relative to the first electromagnetic radiation source and the second electromagnetic radiation source, wherein one of the normal vector of the second sensing element is parallel to a reference axis of a spatial coordinate, and the normal vectors of the other second sensing elements each are relative to the reference axis in order to generate corresponding included angles;

selecting the radiation energies that are received by one part of the first sensing elements and are higher than the radiation energies received by the other first sensing elements;

selecting the radiation energies that are received by one part of the second sensing elements and are higher than the radiation energies received by the other second sensing elements;

obtaining the value of two first spatial direction angles of the first electromagnetic radiation source and the second electromagnetic radiation source respectively relative to the first sensing module according to the matrix operation of the radiation energies received by the one part of the first sensing elements and the two first projection transformation matrixes built by the first sensing module relative to the first electromagnetic radiation source and the second electromagnetic radiation source; and obtaining the value of two second spatial direction angles of the first electromagnetic radiation source and the second electromagnetic radiation source respectively relative to the second sensing module according to the matrix operation of the radiation energies received by the one part of the second sensing elements and the two second projection transformation matrixes built by the second sensing module relative to the first electromagnetic radiation source and the second electromagnetic radiation source.

16. The method as claimed in claim 15, wherein the number of the one part of the first sensing elements is at least three, and the number of the one part of the second sensing elements is at least three.

* * * * *